United States Patent
Ho et al.

(10) Patent No.: US 9,223,679 B1
(45) Date of Patent: Dec. 29, 2015

(54) LIGHTWEIGHT, NON-INTRUSIVE, AND FLEXIBLE APPARATUS TO OBTAIN SYSTEM AND PROCESS STATE

(71) Applicant: EMC Corporation, Hopkinton, MA (US)

(72) Inventors: Jenchang Ho, Sunnyvale, CA (US); Vasu Sangili, San Jose, CA (US); Hyun Kim, Boulder, CO (US)

(73) Assignee: EMC Corporation, Hopkinton, MA (US)

( * ) Notice: Subject to any disclaimer, the term of this patent is extended or adjusted under 35 U.S.C. 154(b) by 139 days.

(21) Appl. No.: 14/189,707

(22) Filed: Feb. 25, 2014

(51) Int. Cl.
 *G06F 11/00* (2006.01)
 *G06F 11/36* (2006.01)
 *G06F 11/07* (2006.01)
 *G06F 11/32* (2006.01)
 *G06F 11/34* (2006.01)

(52) U.S. Cl.
 CPC .......... *G06F 11/362* (2013.01); *G06F 11/0748* (2013.01); *G06F 11/321* (2013.01); *G06F 11/3476* (2013.01); *G06F 11/3604* (2013.01); *G06F 11/3636* (2013.01); *G06F 11/3664* (2013.01)

(58) Field of Classification Search
 CPC ............ G06F 11/3636; G06F 11/3664; G06F 11/0748; G06F 11/321; G06F 11/3476; G06F 11/3604; G06F 11/362
 See application file for complete search history.

(56) References Cited

U.S. PATENT DOCUMENTS

| | | | | |
|---|---|---|---|---|
| 6,901,581 | B1* | 5/2005 | Schneider | G06F 11/3664 714/E11.212 |
| 2006/0069953 | A1* | 3/2006 | Lippett | G06F 11/3636 714/25 |
| 2011/0154236 | A1* | 6/2011 | Stoeck | G06F 17/30 715/771 |
| 2015/0052400 | A1* | 2/2015 | Garrett | G06F 11/362 714/37 |
| 2015/0052403 | A1* | 2/2015 | Garrett | G06F 11/366 714/38.11 |

* cited by examiner

*Primary Examiner* — Charles Ehne
(74) *Attorney, Agent, or Firm* — Blakely, Sokoloff, Taylor & Zafman LLP

(57) ABSTRACT

According to one embodiment, a debug daemon executed by a processor of a data processing system receives a signal from a first program executed within the data processing system. In response to the signal, a snapshot of a memory region associated with the first program is captured. An analysis tool is identified from a pool of analysis tools based on the signal in view of a set of one or more rules associated with the first program. The analysis tool is invoked to perform an analysis on the snapshot to generate a summary that describes the snapshot. The summary is transmitted from the data processing system to a remote system over a network, without transmitting the snapshot.

22 Claims, 8 Drawing Sheets

* Default is 5.
* To disable debug daemon for ddfs
  * Echo 0 > /proc/`pidof ddfs`/debug_daemon
* To enable ddfs live crash script
  * echo 1 > /proc/`pidof ddfs`/debug_daemon
* To enable ddfs mini dump
  * echo 2 > /proc/`pidof ddfs`/debug_daemon
* To enable ddfs summary report
  * echo 4 > /proc/`pidof ddfs`/debug_daemon
* To enable self triage
  * echo 8 > /proc/`pidof ddfs`/debug_daemon
* To enable both live crash & ddfs summary report
  * echo 5 > /proc/`pidof ddfs`/debug_daemon

FIG. 5

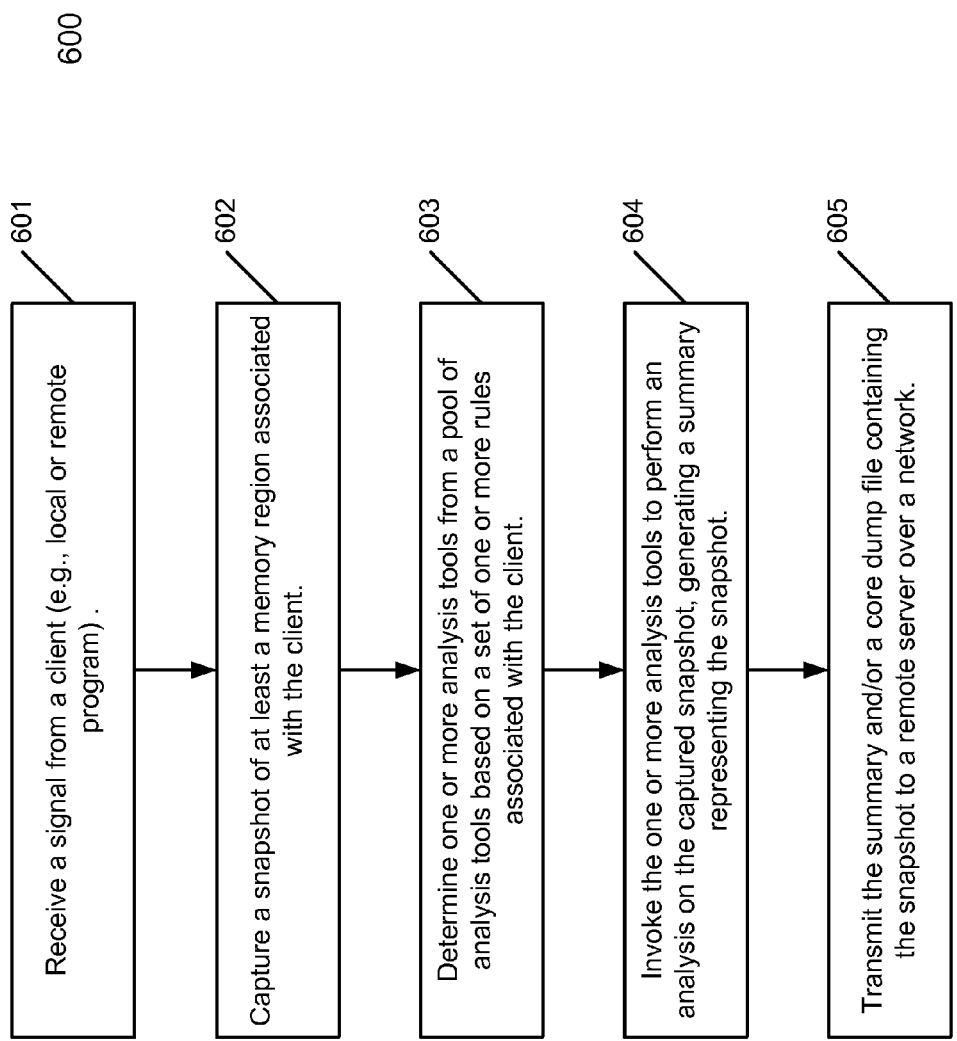

LIGHTWEIGHT, NON-INTRUSIVE, AND FLEXIBLE APPARATUS TO OBTAIN SYSTEM AND PROCESS STATE

FIELD OF THE INVENTION

Embodiments of the present invention relate generally to debugging software applications. More particularly, embodiments of the invention relate to debugging framework using a debug daemon.

BACKGROUND

Debuggers are used in both development and field environments to determine if program code is operating properly, and to investigate faults that cause improper program behavior that is apparent, such as non-terminating behavior. Debuggers generally provide views of the various aspects of internal program function and structure, such as traces of program execution path and views of program variables, in addition to hardware observation capabilities such as register and memory value snooping.

In a remote debugging situation, typically, when a program executed in a data processing system (e.g., an appliance system deployed at a client site) detects a predefined event, such as a page fault failure, a memory snapshot is captured and stored in a file, referred to as a core dump file. The core dump file is then transmitted to a remote system (e.g., a centralized management system) over a network for further offline analysis.

In software, a core dump (memory dump) is to preserve a task statistics and data when it encounters a fatal error. Once the memory has been written to disks as a core dump file in the binary format, programmers later use the core dump file with its binary object in order to triage the fatal error. However, this process does not scale well if the dump-able memory size is huge. It is not only consuming a long time to write all the memory into disks, transferring the core file over the network is even taking 10×-50× more time for such a big file (e.g., in a gigabyte (GB) range), which requires a significant higher bandwidth or resources. Sometimes needing a core file for the error triage is misleading. If all the needed information can be presented to programmers in a concise format, this can help to root cause the fatal error without needing the core file.

BRIEF DESCRIPTION OF THE DRAWINGS

Embodiments of the invention are illustrated by way of example and not limitation in the figures of the accompanying drawings in which like references indicate similar elements.

FIG. 5 shows certain configuration command for configuring a debug system according to one embodiment of the invention.

FIG. 6 is a flow diagram illustrating a method for debugging according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a debug framework is utilized to collect the needed information at an user process panicking time, via a suspension check point inside the process fatal handling routine. In addition, a user process daemon running in the background to capture additional information. When a process encounters a fatal error, the process will enter the suspension point inside the kernel to prevent the fatal process of moving forward and preserve all the states and data at panicking time. Then, the kernel will send a signal to the daemon to collect the needed information. Based on the predefined behavior, the daemon can invoke an analysis tool (e.g., user space and/or kernel space debuggers) to obtain the process data, or a kernel analysis utility to collect the kernel statistics. The kernel can also leave the fatal suspended process without sending any signal to the daemon to allow a programmer can use a debugger to do live triage.

In one embodiment, a debug daemon executed by a processor of a data processing system receives a signal from a first program executed within the data processing system. In response to the signal, a snapshot of a memory region associated with the first program is captured. An analysis tool is identified and selected from a pool of analysis tools based on the signal in view of a set of one or more rules associated with the first program. The analysis tool is invoked to perform an analysis on the snapshot to generate a summary that represents or describes the snapshot. The summary is transmitted from the data processing system to a remote system over a network, without transmitting the entire snapshot.

Figure 1:
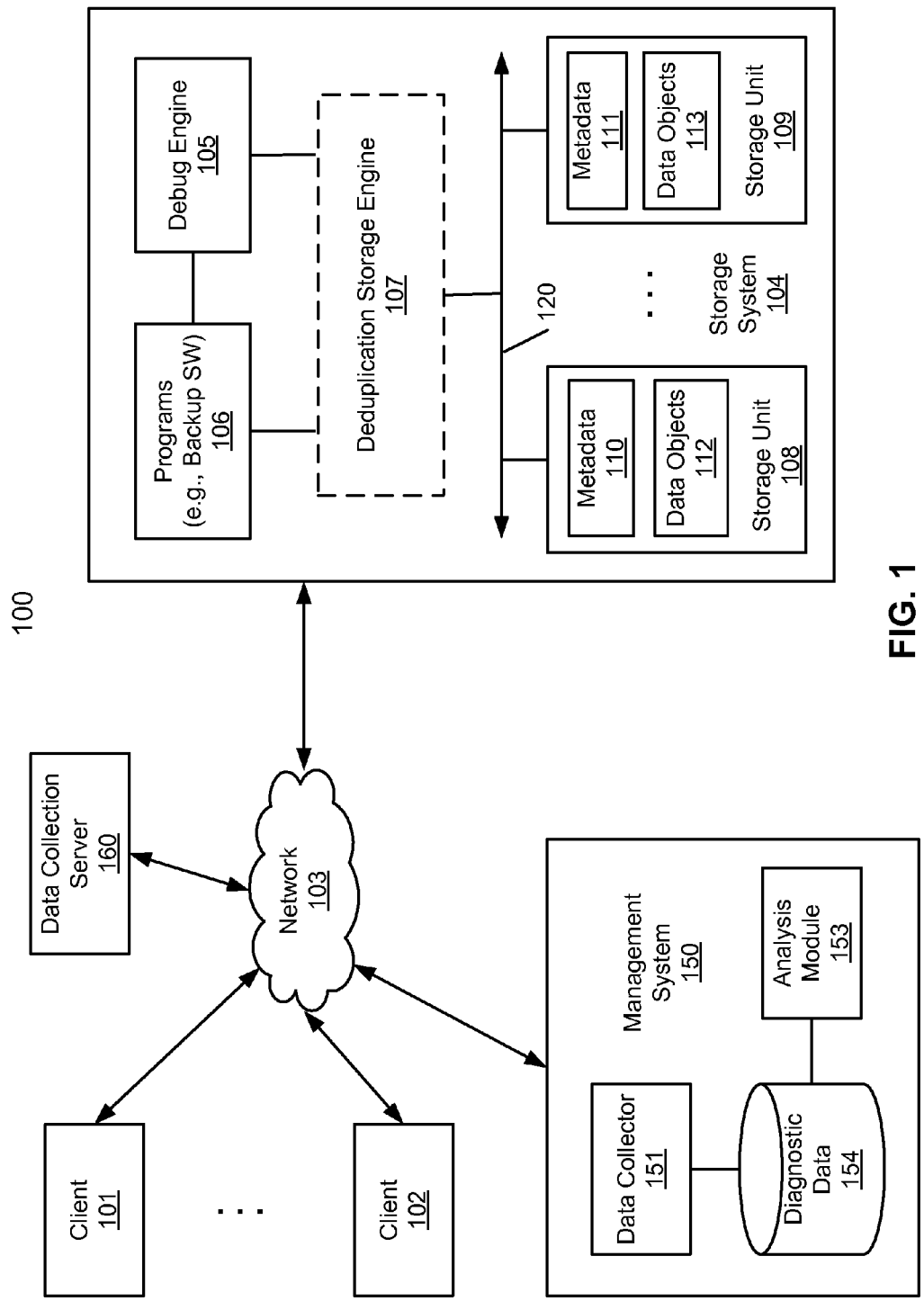
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, one or more programs 106 may be executed, either as a user space process or a kernel space process, in storage system for providing access of data stored in storage units 108-109. For example, program 106 may be a backup software application that backs up data from a variety of clients such as clients 101-102 over network 103. Storage system 104 may be deployed within or near a client site (e.g., a corporate campus). Although only one storage system 104 is shown, there may be multiple storage systems that are geographically deployed and centrally managed by management system 150 remotely over network 103.

Management system 150 may be configured to communicate with each of the storage systems, in this example, storage system 104, to configure the storage systems and collect data from them. Specifically, management system 150 may include a data collector 151 to periodically collect diagnostic data from storage system 104, where the diagnostic data may be stored in a repository as a part of diagnostic data 154. Diagnostic data 154 may be further analyzed by an analysis module 153. Alternatively, diagnostic data 154 may be collected by a third party data collection agent 160 and transmitted to management system 150 for analysis.

In one embodiment, the diagnostic data may be the debug information produced by debug engine 105 that is communicatively coupled to applications 106, for example, via an inter-process call (IPC) or an application programming interface (API). Debug engine 105 is configured to monitor the operations of application 106 and capture the debugging or diagnostic information concerning program 106, and then transmit (optionally via data collection agent 160) the captured diagnostic information to management system 150 to be stored as part of diagnostic data 154. The diagnostic data 154 may be further analyzed by analysis module 153.

According to one embodiment, when program 106 detects a predefined event (e.g., error), program 106 communicates with debug engine 105, for example, via an IPC call or an API, indicating that certain event or error has occurred. In response to the detection, program 106 may suspend itself or be suspended by debug engine 105 or the operating system (e.g., kernel). In response to a signal received from program 106, debug engine 105 captures a snapshot from a memory region that is associated with program 106. In one embodiment, instead of sending the entire snapshot to management system 150 over network 103, debug engine 105 performs an analysis on the captured snapshot to generate a summary describing the content of the snapshot. Based on the summary, debug engine 105 determines whether there is a need to send the entire snapshot as a core dump file to management system 150. Based on the analysis of the summary and/or snapshot, if there is no need to send the entire snapshot, only the summary is transmitted from storage system 104 to management system 150; otherwise, the snapshot and the summary may be transmitted to management system 150. In addition, if the summary can narrow the root cause into a sub-component such as Index 1024 in deduplication storage engine 1001 in FIG. 7, a partial snapshot can be taken instead of a full snapshoot.

For example, based on the analysis of the snapshot, if the detected error is a previously known error, debug engine 105 may transmit only the summary to management system 150 without sending the entire snapshot. On the other hand, if the detected error or behavior of program 106 is unknown or the summary does not contain sufficient information to ascertain the cause of the error or actions to correct the error, the entire snapshot and the summary may then be transmitted to management system 150 for further analysis. The rationale behind this is that if the captured error has been previously known, there is no need to send the entire snapshot to management system 150 because management system 150 has likely already analyzed the same error. The entire snapshot is transmitted to management system 150 only if it is determined that the detected error is new to management system 150. As a result, the network bandwidth and processing resources required to handle these diagnostic processes can be greatly reduced.

According to another embodiment, debug engine 105 (also referred to as a diagnostic engine or monitoring module) may be part of a diagnostic system equipped with a periodic "phone home" feature. In this example, storage system 104 may be one of many storage appliances geographically deployed at various sites. Management system 150 may be associated with a storage provider such as EMC® Corporation that provides the storage appliances such as storage system 104. Each of the storage systems includes a diagnostic system that periodically captures certain operating statistics of the corresponding storage system and sends the captured information back "home" to management system 150 for subsequent data mining purposes.

In one embodiment, debug engine 105 may periodically collect statistical data concerning overall operations of storage system 104 and perform analysis on the collected data to generate a summary. Based on the analysis, debug engine 105 may or may not send the entire collected data to management system 150; rather it may only send the summary. Debug engine 105 may specifically target a specific process such as program 106, dependent upon the specific configuration which may be configured by an administrator. For example, debug engine 105 may periodically capture a snapshot of a memory region associated with program 106, perform an analysis to generate a summary, and then send the summary and/or the snapshot back "home" to system 150.

As described above management server 150 may manage many of appliance devices such as storage system 104 geographically deployed in different locations of the same or different clients or customers. Management server 150 can collect various data from the appliance devices and analyze them. Management server 150 can also, based on the analysis, configure or reconfigure any of the appliance devices by sending the configuration information (e.g., in a form of script, extensible markup language or XML) to the devices over a network. Such operations can be performed dynamically without having to shutting down or disrupting operations of the appliance devices.

Note that throughout this application, a backup software application of a storage system is utilized as a program of which the debug or diagnostic information is captured and transmitted using an efficient debug framework. However, the techniques described throughout this application can also be applied in any other operating environments or systems.

Figure 2:
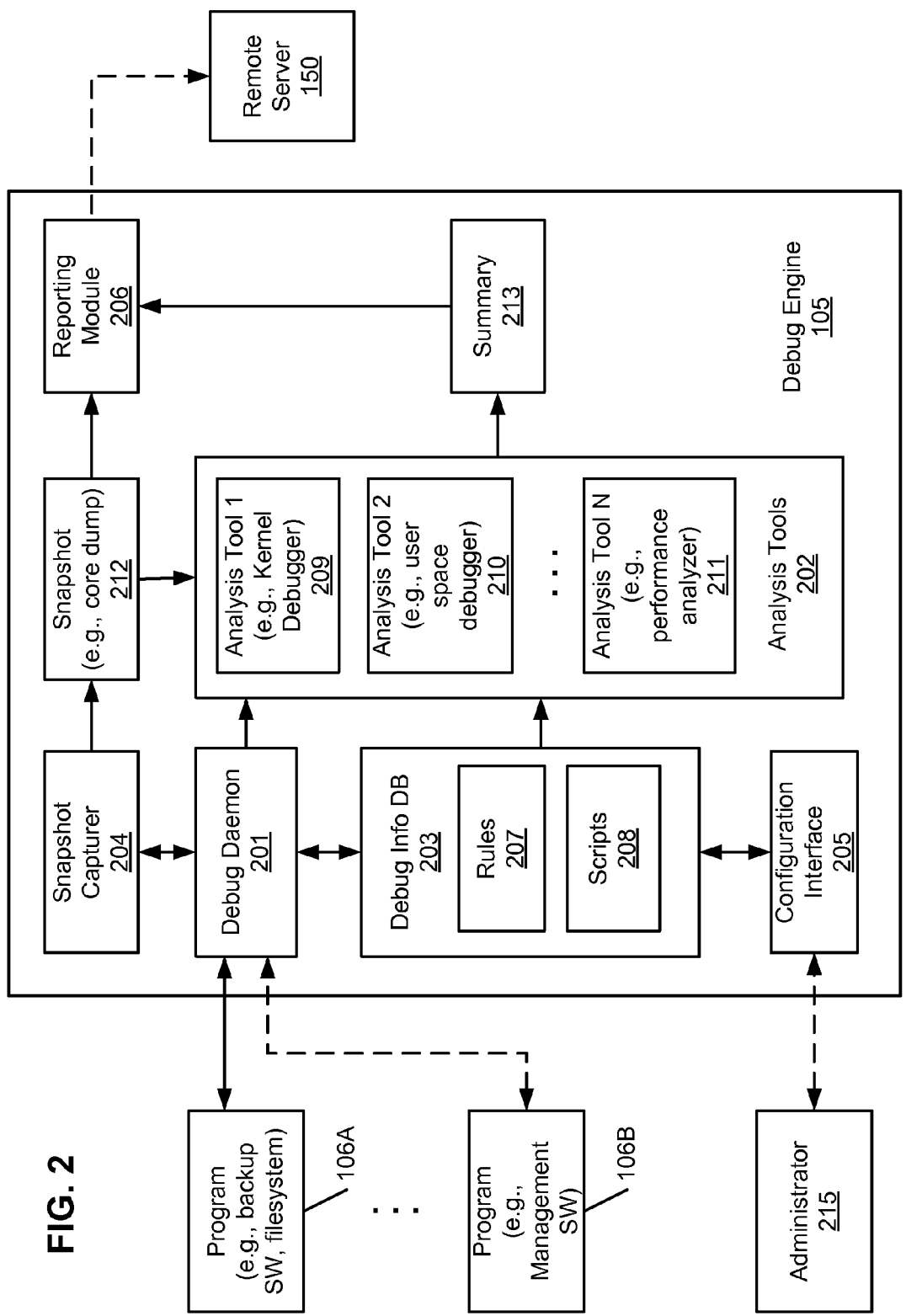
FIG. 2 is a block diagram illustrating an example of a debug engine according to one embodiment of the invention.

FIG. 2 is a block diagram illustrating an example of a debug engine according to one embodiment of the invention. Referring to FIG. 2, debug engine 105, which may be implemented in software, hardware, or a combination thereof, includes a debug daemon 201 and a set of one or more analysis tools 202. Debug engine 105 provides a communications interface to allow various clients, in this example, programs 106A-106B, to communicate with and invoke resources of the debug engine 105 for the purpose of collecting diagnostic data.

Analysis tools 202 may include any kinds of analysis tools 209-211 that can be installed and configured to be utilized by debug daemon 201. Examples of analysis tools 209-211 may include a user space debugger, a kernel debugger, and/or a performance analysis tool. A user space debugger may be a GDB™ debugger and a kernel debugger may be a CRASH™ kernel debugger available in an Open Source™ community, for example, for LINUX operating system. Alternatively, an analysis tool may be a proprietary debugger such as WinDbg™ for Windows™ operating system available from Microsoft® Corporation. Dependent upon the operating system involved, the availability of analysis tools 209-211 may be different, which may be configured as part of configuration information stored in debug information database or data structure 203. These analysis tools in turn use preprogrammed scripts to retrieve information relevant for the specific components.

According to one embodiment, an administrator 215 can access and configure debug database of debug engine 105 via configuration interface 205 locally and/or remotely. Administrator 215 can configure a set of rules 207, scripts 208, as well as installing or configuring analysis tools 202, which are specifically tailored to a particular data processing system (e.g., a particular storage system) in which debug engine 105 is deployed. For example, if an operating system of the data processing system in which debug engine 105 is deployed is a Windows operating system, the analysis tools that are associated with the Windows operating system may be enabled and configured, while other unrelated tools such as LINUX debuggers may be disabled. The rules 207 may be configured to govern what processes should be performed in response to which of the predefined events. Rules 207 may further specify the specific processes to be performed on a particular event of a particular program under a specific condition. Scripts 208 may be programmed offsite and received from administrator 215 to specify the processing steps or operations to be performed based on the rules 207.

According to one embodiment, when program 106A detects a predefined event occurred during an execution of program 106A, which may be a backup software application. In response to the event, program 106A communicates with debug daemon 201 by sending a predefined signal to debug daemon 201. In addition, program 106A may suspend itself, or alternatively program 106A may be suspended by debug daemon 201 in response to the signal. Program 106A may communicate with debug daemon 201 via an IPC call or an API. The signal may further identify an identity of program 106A such as a process identifier (ID) associated with program 106A and/or an event ID identifying a specific predefined event that has occurred.

In one embodiment, in response to the signal received from program 106A, debug daemon 201 invokes snapshot capturer 204 to capture content of at least a memory region or memory space that is associated with program 106A, generating a snapshot 212. Snapshot 212 may be cached in a persistent storage associated with debug engine 105 or alternatively maintained within a memory of the system. Snapshot 212 may be captured while program 106A is suspended, where program 106A may be suspended by itself or by another component such as debug daemon 201.

Based on the signal received from program 106A, according to one embodiment, debug daemon 201 examines the rules 203 that have been previously configured, for example, administrator 215, to determine what actions should be taken and which of the analysis tools 209-211 should be utilized. For example, if the received signal indicates that a user space event has occurred, a user space analysis tool (e.g., user space debugger) may be invoked. Similarly, if the signal indicates that a kernel event has occurred, a kernel debugger may be invoked. In other situations, both of user space and kernel space debuggers, or additional analysis tool (e.g., performance analysis tool) may be invoked dependent upon the associated rules 207 in view of the signal. The signal can specifically specify what data should be collected, such as for example, user space data, user space data including all threads stack trace, kernel space data, leaving the program suspended so that a user can debug manually, etc. The signals received from the same or different clients can be queued.

Each of the one or more selected analysis tools is configured to perform an analysis on snapshot 212 and collectively generate a summary 213 that describes the content of the snapshot 212. Based on summary 213, reporting module 206 may transmit summary 213 and/or snapshot 212 to remote server 150. Under some circumstances, only summary 213 is transmitted to remote server 150 while in other situations, both summary 213 and snapshot 212 may be transmitted to remote server 150. The size of summary 213 may be a megabyte (MB) range while snapshot 212 may be in a GB range. Thus, if only summary 213 is transmitted to remote system 150, the network traffic and/or the resources required for processing may be significantly reduced, as the remote system 150 may receive and process diagnostic data from thousands of appliance devices deployed at various locations.

For example, if it is determined there is no new issue described by summary 213, only summary 213 will be transmitted to remote server 150 while snapshot 212 is not transmitted to reduce network traffic and processing bandwidth. In this situation, remote server 150 has already "seen" such data and there is no need for remote server 150 to analyze again. On the other hand, if summary 213 indicates that there is a new or unknown issue or error, snapshot 212 and/or summary 213 may be transmitted remote server 150 for further analysis because remote server 150 has not "seen" it before. From the stack trace collected by the summary, it will provide some detailed information such as code line number and/or function parameters at the fatal point. If the line number matches a previous known issue, the snapshot can be ignored. According to one embodiment, an analysis tool may parse or scan the snapshot to identify any known data pattern or signature by matching a template defining such data pattern or signature, where the data pattern represents a particular type of events or issues. The templates may also be configured by an administrator, for example, as an executable and editable script. For example, a summary may contain every thread's stack trace for a fatal process in order to get the fatal point. If additional metadata cannot be obtained at the fatal point, then, additional scripts can be applied to get these metadata. The process to extract the information from the snapshot is actually the same as the summary.

According to another embodiment, as described before, debug engine 105 may be utilized as part of periodic diagnostic system. Debug engine 105 is part of a framework that allows various clients to hook up with the debug engine 105 via an IPC or API to access various resources, such as analysis tools 202, of the framework. In one embodiment, program 106B may be another process or daemon that is configured to monitor the operations of the corresponding data processing system (e.g., storage system) and to send (e.g., phone home) information describing the operational statistics of the data processing system to remote server 150, periodically or on demand. In one embodiment, program 106B may periodically instruct debug daemon 201 to capture a snapshot, to generate a summary, and send the summary and/or snapshot to remote system 150 dependent upon the circumstances, as described above. Program 106B may be a remote program executed in a remote node that is communicatively coupled to debug engine 105 over a network. Note that some or all of the components as shown in FIG. 2 may be implemented in software, hardware, or a combination thereof.

Figure 3:
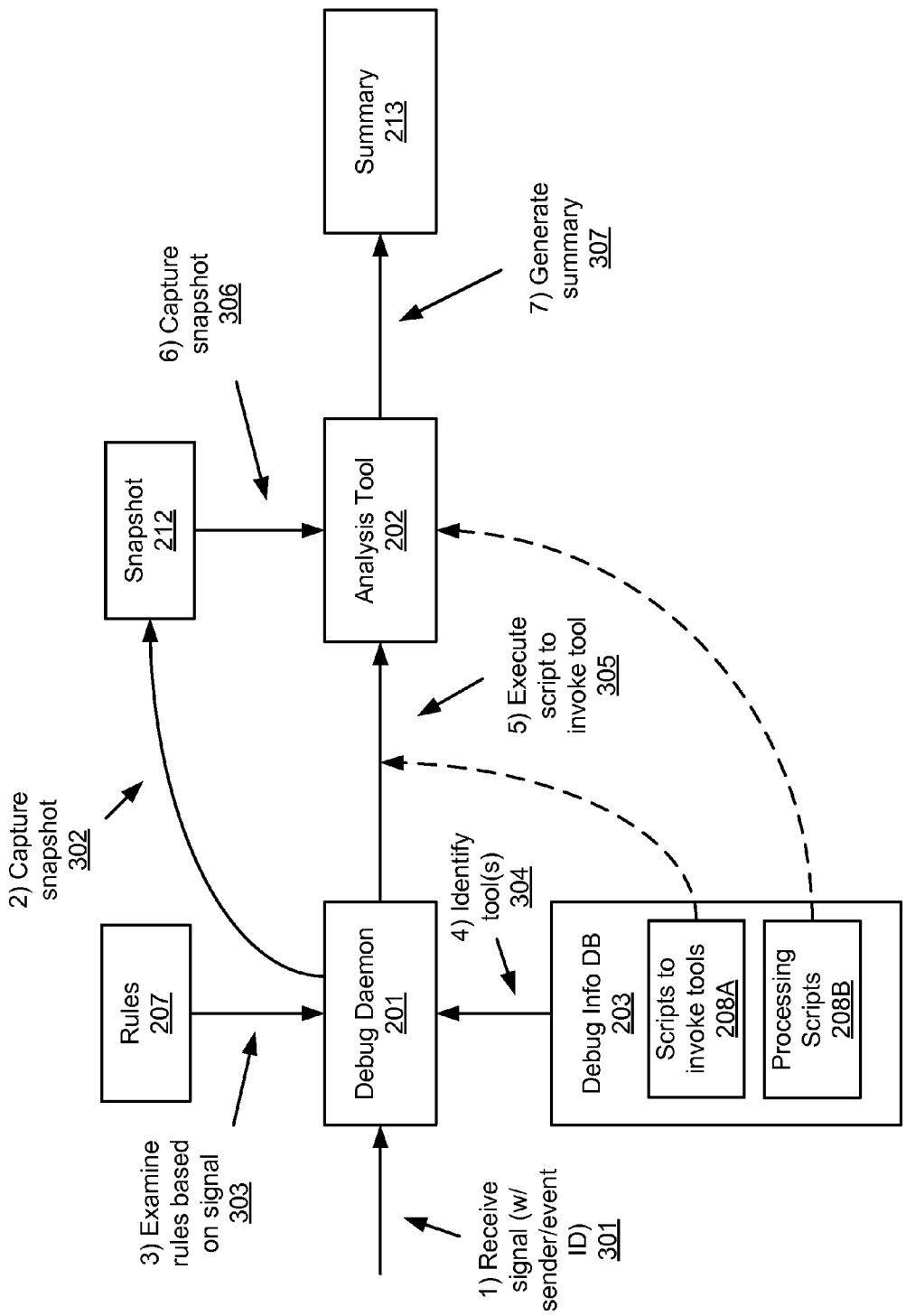
FIG. 3 is a block diagram illustrating a processing flow of a debug framework according to one embodiment of the invention.

FIG. 3 is a block diagram illustrating a processing flow of a debug framework according to one embodiment of the invention. Referring to FIG. 3, debug daemon 201 receives a signal via path 301 from a client, where the client may be a program (e.g., user space or kernel space process) executed locally within a data processing system in which debug daemon 201 is executed. Alternatively, the client may be a remote program running within a remote node over a network. In response to the signal, debug daemon 201 captures or invokes a snapshot capturer to capture a snapshot of at least the memory region of the memory of the data processing system that is associated with the client. In one embodiment, prior to capturing the snapshot, if the client is a locally executed program that detects a predetermined event, the client is suspended, either by the program itself or by debug daemon 201. If the signal is received from a management process running locally or from a remote node, at least some of the processes or threads, either in the user space or kernel space, will be suspended. The signal may include sufficient information identifying the client and the circumstances (e.g., process ID and/or event ID) under which the diagnostic data should be captured.

In one embodiment, signal, debug daemon 201 examines a set rules 207 via path 303 to determine what actions should be taken in view of the signal received. The operations involved in paths 302 and 303 may be performed in different order or in parallel. The set of rules 203 may be previously configured, for example, by an administrator, specifically tailored to the data processing system and/or the client. Based on the set of rules 203, one or more analysis tools 202 are identified from debug information database 203 via path 304. In one embodiment, an analysis tool is invoked by executing a corresponding script 208A with a set of parameters defined in script 208B, via path 305. Based on the scripts 208A-208B, analysis tool 202 is configured to examine snapshot 212 via path 306 and to generate summary 213 via path 307.

Figure 4A:
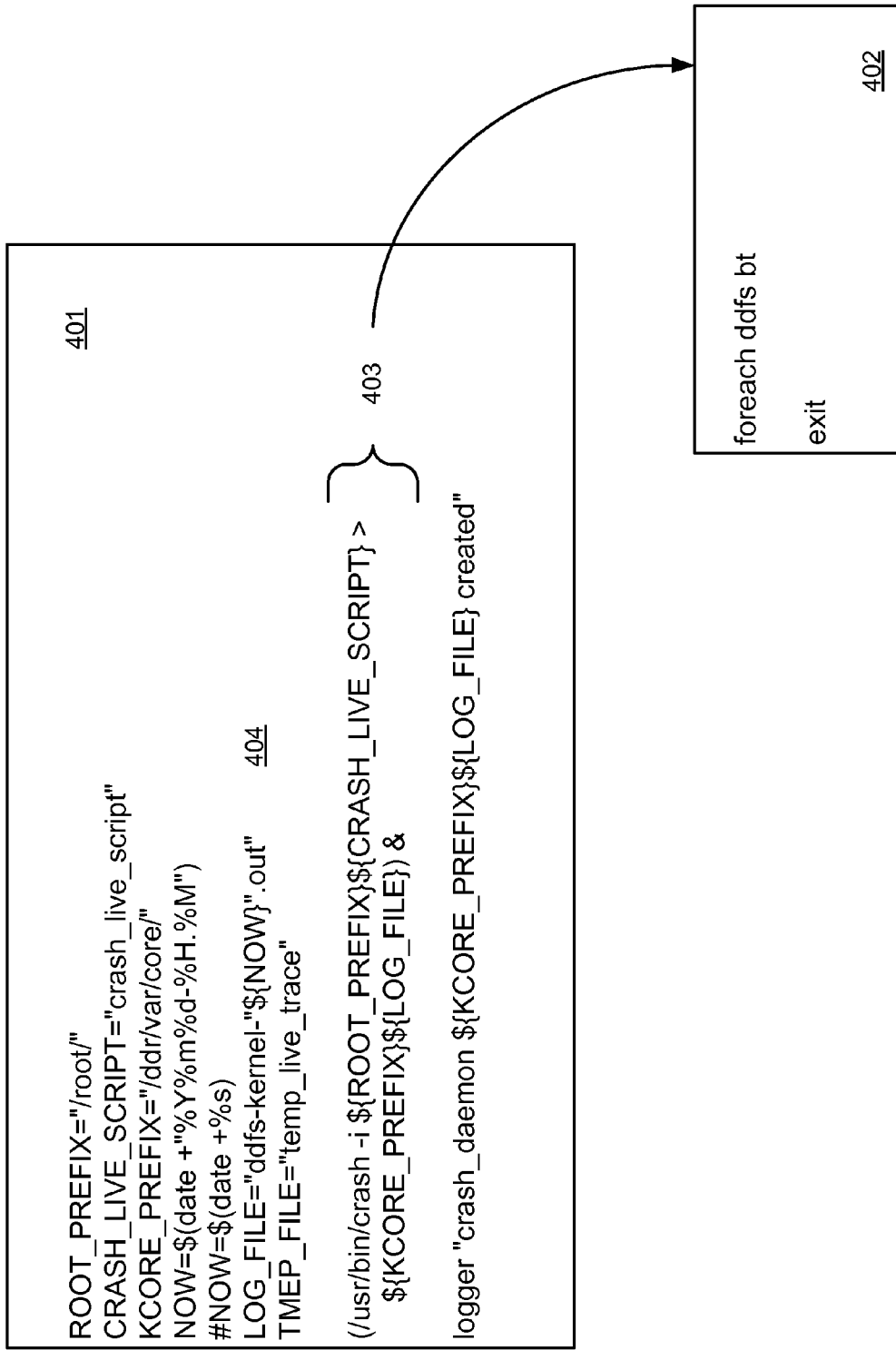
FIGS. 4A and 4B are examples of scripts according to one embodiment of the invention.
Figure 4B:
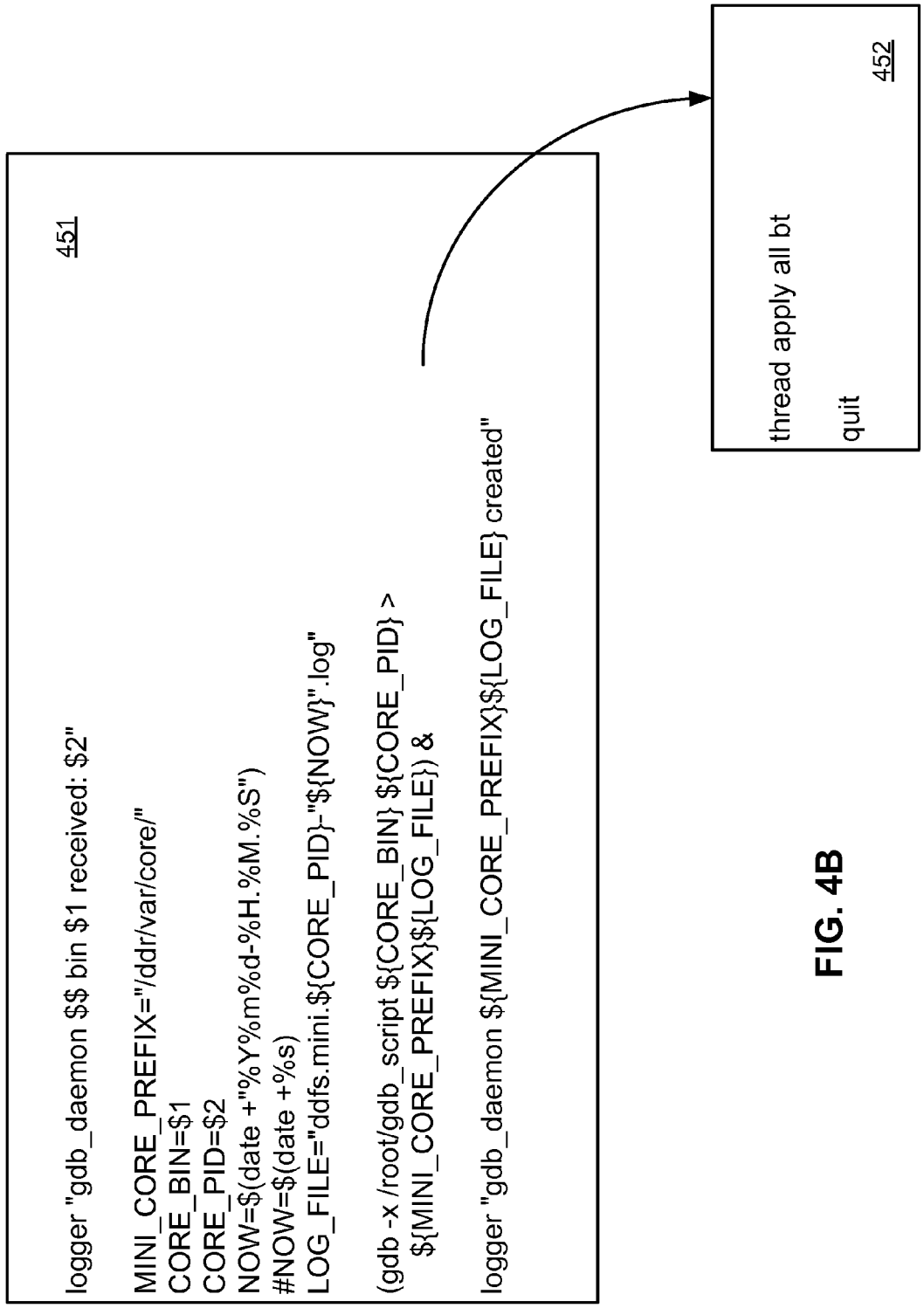

FIGS. 4A and 4B are diagram illustrating an example of scripts according to one embodiment of the invention. For example, script 401 may be part of script 208A and script 402 may be part of script 208B. Referring to FIG. 4A, in this example, script 401, when executed, is to invoke a kernel debugger CRASH with a set of parameters defined in script 402. Within script 401, a user can specify an output filename for the analysis (e.g., code line 404) and the specific analysis tool (e.g., code line 403) to be invoked. The output of the analysis may be formulated into a summary. Referring now to FIG. 4B, in this example, script 451 may be used to invoke a user space debugger GDB with a set of input parameters defined in script 452. FIG. 5 shows a list of commands used to configure a debug engine according to one embodiment of the invention. These commands can be received from an administrator such as administrator 215 of FIG. 2. These commands are doing similar jobs. For a GDB script, it collects every thread's user space stack trace in a deduplication storage engine. For a CRASH script, it collects the kernel stack traces for the deduplication storage engine.

FIG. 6 is a flow diagram illustrating a method for debugging according to one embodiment of the invention. Method 600 may be performed by processing logic which include software, hardware, or a combination thereof. For example, method 600 may be performed by debug engine 105. Referring to FIG. 6, at block 601, processing logic receives a signal from a client for diagnostic data. The client may be locally executed program that detects a predetermined event occurred during its execution. Alternatively, the client may be a management function configured to periodically monitor and diagnose the system. Further, the client may be remote client over a network to obtain certain diagnostic data. In response to the signal, at block 602, processing logic captures a snapshot of at least a portion of a memory of the data processing system. For example, if the client is a locally executed program that detects an event, processing logic may capture a snapshot of at least a memory region of the memory associated with that program. In one embodiment, prior to capturing the snapshot, the program may be suspended, so that the snapshot can accurately represent the states of the program in memory at the point in time. If the client is part of a management function, either locally or remotely, processing logic may examine the command received from the client and capture a snapshot of a memory area or region as specified by the command.

At block 603, processing logic determines one or more analysis tools from a pool of analysis tools based on a set of one or more rules associated with the client. For example, from the signal, the processing logic may determine the client identity based on its process ID and/or event ID or command that can be extracted from the signal or request received from the client. Based on the client's identity and command, processing logic accesses an internal database to determine the actions to be taken, including determining what analysis tools should be invoked and how they will be invoked (e.g., what and how the scripts should be executed). At block 604, the identified analysis tools are invoked to perform an analysis on the captured snapshot, generating a summary representing or describing the snapshot. At block 605, dependent upon the analysis, the summary and/or the snapshot are transmitted to a remote system over a network.

Figure 7:
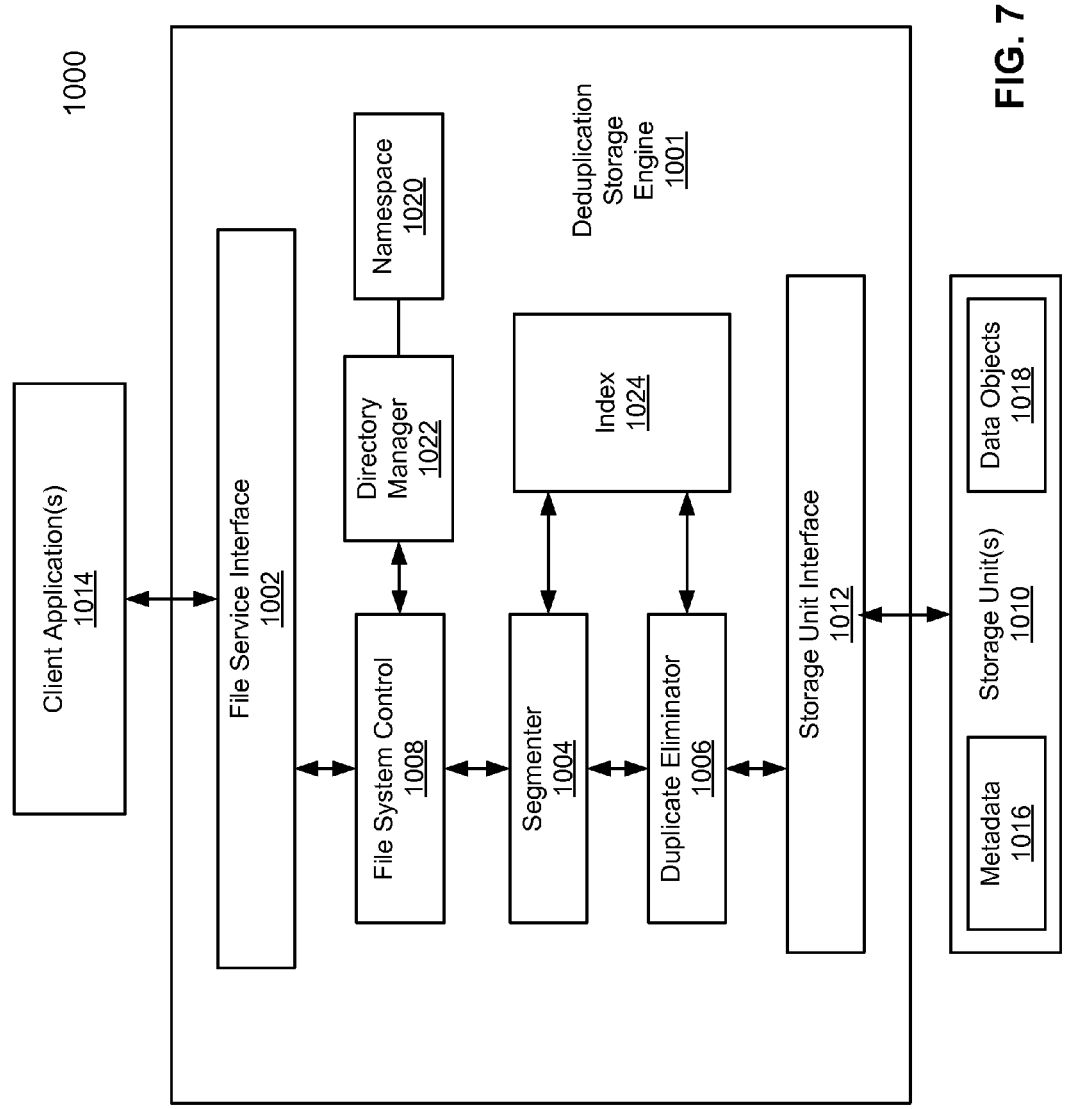
FIG. 7 is a block diagram illustrating a deduplicated storage system according to one embodiment of the invention.

FIG. 7 is a block diagram illustrating a deduplication storage system according to one embodiment of the invention.

For example, deduplication storage system 1000 may be implemented as part of a deduplication storage system as described above, such as, for example, the deduplication storage system as a client and/or a server as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004 (also referred to as a chunking module or unit), duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving, at a debug daemon executed by a processor of a data processing system, a signal from a first program executed within the data processing system;
   in response to the signal, capturing a snapshot of a memory region associated with the first program;
   identifying an analysis tool from a pool of analysis tools based on the signal in view of a set of one or more rules associated with the first program;
   invoking the analysis tool to perform an analysis on the snapshot to generate a summary that describes the snapshot; and
   transmitting the summary from the data processing system to a remote system over a network, without transmitting the snapshot.

2. The method of claim 1, further comprising suspending the first program prior to capturing the snapshot.

3. The method of claim 1, wherein transmitting the summary to the remote system comprises:
   performing a second analysis on the summary to determine whether the summary includes sufficient information describing the snapshot; and
   transmitting both the summary and the snapshot to the remote system if the summary does not include sufficient information.

4. The method of claim 3, wherein perform a second analysis on the summary comprises determining whether a previously known event has occurred based on the summary, and wherein the summary is transmitted to the remote system without the snapshot if the previously known event is detected.

5. The method of claim 4, further comprising transmitting the snapshot to the remote system, if an unknown event is detected based on the summary.

6. The method of claim 1, wherein the pool of analysis tools comprises a user space debugger and a kernel space debugger associated with an operating system of the data processing system.

7. The method of claim 1, wherein the identified analysis tool is to analyze the snapshot directly from the memory region without storing the snapshot to a file in a persistent storage within the data processing system.

8. The method of claim 1, further comprising:
   periodically receiving at the debug daemon a request from a second program to capture a snapshot; and
   in response to the request, performing capturing the snapshot, analyzing the snapshot, generating the summary, and transmitting the summary to the remote system.

9. The method of claim 8, wherein the signal is received from the first program via a first inter-process call (IPC) and the request is received from the second program via a second IPC.

10. A non-transitory machine-readable medium having instructions stored therein, which when executed by a processor, cause the processor to perform operations, the operations comprising:

receiving, at a debug daemon executed by a processor of a data processing system, a signal from a first program executed within the data processing system;
in response to the signal, capturing a snapshot of a memory region associated with the first program;
identifying an analysis tool from a pool of analysis tools based on the signal in view of a set of one or more rules associated with the first program;
invoking the analysis tool to perform an analysis on the snapshot to generate a summary that describes the snapshot; and
transmitting the summary from the data processing system to a remote system over a network, without transmitting the snapshot.

11. The non-transitory machine-readable medium of claim 10, wherein the operations further comprise suspending the first program prior to capturing the snapshot.

12. The non-transitory machine-readable medium of claim 10, wherein transmitting the summary to the remote system comprises:
performing a second analysis on the summary to determine whether the summary includes sufficient information describing the snapshot; and
transmitting both the summary and the snapshot to the remote system if the summary does not include sufficient information.

13. The non-transitory machine-readable medium of claim 12, wherein perform a second analysis on the summary comprises determining whether a previously known event has occurred based on the summary, and wherein the summary is transmitted to the remote system without the snapshot if the previously known event is detected.

14. The non-transitory machine-readable medium of claim 13, wherein the operations further comprise transmitting the snapshot to the remote system, if an unknown event is detected based on the summary.

15. The non-transitory machine-readable medium of claim 10, wherein the pool of analysis tools comprises a user space debugger and a kernel space debugger associated with an operating system of the data processing system.

16. The non-transitory machine-readable medium of claim 10, wherein the identified analysis tool is to analyze the snapshot directly from the memory region without storing the snapshot to a file in a persistent storage within the data processing system.

17. The non-transitory machine-readable medium of claim 10, wherein the operations further comprise:
periodically receiving at the debug daemon a request from a second program to capture a snapshot; and
in response to the request, performing capturing the snapshot, analyzing the snapshot, generating the summary, and transmitting the summary to the remote system.

18. The non-transitory machine-readable medium of claim 17, wherein the signal is received from the first program via a first inter-process call (IPC) and the request is received from the second program via a second IPC.

19. A data processing system, comprising:
a processor; and
a memory coupled to the processor for storing instructions, which when executed from the memory, cause the processor to
receive, at a debug daemon executed by the processor, a signal from a first program executed within the data processing system,
in response to the signal, capture a snapshot of a memory region associated with the first program,
identify an analysis tool from a pool of analysis tools based on the signal in view of a set of one or more rules associated with the first program,
invoke the analysis tool to perform an analysis on the snapshot to generate a summary that describes the snapshot, and
transmit the summary from the data processing system to a remote system over a network, without transmitting the snapshot.

20. The system of claim 19, wherein the first program is suspended prior to capturing the snapshot.

21. The system of claim 19, wherein transmitting the summary to the remote system comprises:
performing a second analysis on the summary to determine whether the summary includes sufficient information describing the snapshot; and
transmitting both the summary and the snapshot to the remote system if the summary does not include sufficient information.

22. The system of claim 21, wherein perform a second analysis on the summary comprises determining whether a previously known event has occurred based on the summary, and wherein the summary is transmitted to the remote system without the snapshot if the previously known event is detected.

* * * * *